Dec. 15, 1964  C. D. SWANSON  3,161,320
ARTICLE DISPENSER HAVING ARTICLE WITHDRAWING MEANS
Filed July 30, 1962
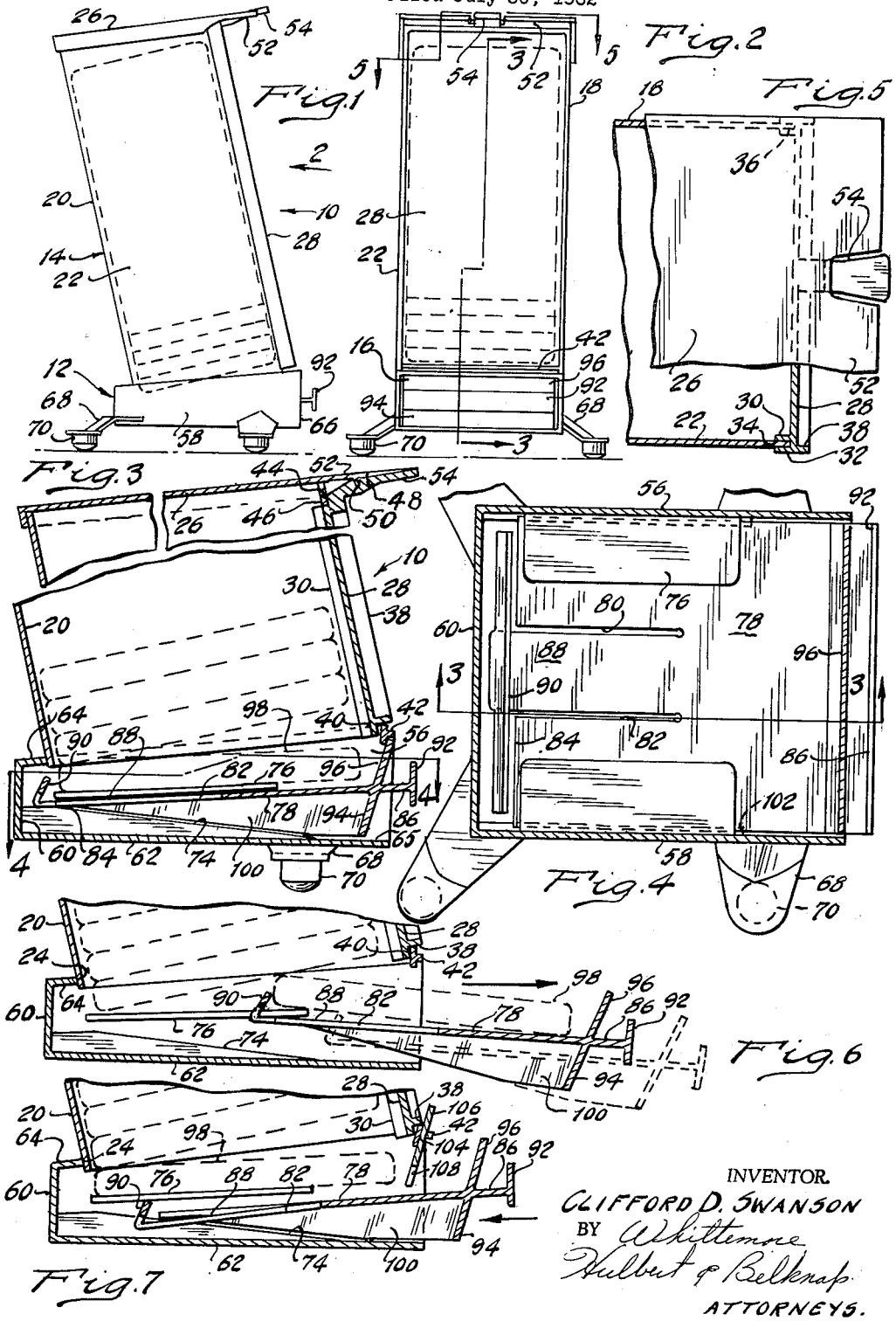
INVENTOR.
CLIFFORD D. SWANSON
BY Whittemore
Hulbert & Belknap
ATTORNEYS.

United States Patent Office 3,161,320
Patented Dec. 15, 1964

3,161,320
ARTICLE DISPENSER HAVING ARTICLE
WITHDRAWING MEANS
Clifford D. Swanson, 2101 Wellesley Drive,
Lansing, Mich.
Filed July 30, 1962, Ser. No. 213,262
6 Claims. (Cl. 221—255)

The invention relates to storage and dispensing structures and refers more specifically to a structure for storing bread and dispensing individual slices therefrom in a sanitary manner.

In the past bread boxes, drawers and the like have been used for the storage of bread and similar articles. These devices are not suitable for rapid dispensing of the articles and have generally been difficient in that they require the storing of the articles in a moisture retaining wrapper to maintain the articles in a fresh condition.

It is therefore one of the objects of the present invention to provide an improved storage and dispensing structure for bread or similar articles.

Another object is to provide bread storage and dispensing structure comprising a base, a barrel secured to said base and extending vertically therefrom for receiving individual slices of bread and a tray insertable within said base for withdrawing single slices of bread from the base fed thereto from the barrel.

Another object is to provide structure as set forth above wherein the barrel is inclined with respect to the vertical.

Another object is to provide structure as set forth above wherein one side of the barrel is removable to permit the loading of the barrel with bread and means are provided for sealing the one side in position on the barrel.

Another object is to provide structure as set forth above wherein the base is rectangular and is provided with ramps at opposite sides of the interior thereof, an opening is provided in another side of the base extending between said opposite sides thereof through which the tray is inserted and withdrawn and a pair of horizontal ears are provided extending inwardly of the base from said opposite sides thereof for supporting bread in the barrel.

Another object is to provide structure as set forth above wherein the tray is a substantially flat rectangular plate having a pair of slits extending from one edge thereof toward the opposite edge and includes a flange secured to the one edge of the portion of the plate between said slits and in spaced relation vertically with respect to the plate and further including vertically extending flanges at the opposite edge of the plate for closing said opening in the base with the tray inserted within the base and for gripping the tray.

Another object is to provide structure as set forth above wherein the opening in said another side of said base is variable in area.

Another object is to provide bread storage and dispensing structure which is simple in construction, economical to manufacture and efficient in use.

Other objects and features of the invention will become apparent as the description proceeds, especially when taken in conjuntion with the accompanying drawings, illustrating a preferred embodiment of the invention, wherein:

FIGURE 1 is a side elevation of storage and dispensing apparatus constructed in accordance with the invention.

FIGURE 2 is a front elevation of the storage and dispensing structure illustrated in FIGURE 1 taken in the direction of arrow 2 in FIGURE 1.

FIGURE 3 is an enlarged, broken longitudinal section of the storage and dispensing structure illustrated in FIGURE 1 taken substantially on the line 3—3 in FIGURE 2.

FIGURE 4 is a cross section of the storage and dispensing structure illustrated in FIGURE 1 taken substantially on the line 4—4 in FIGURE 3.

FIGURE 5 is an enlarged partial section of the storage and dispensing structure illustrated in FIGURE 1 taken substantially on the line 5—5 in FIGURE 2.

FIGURE 6 is an enlarged partial section of the storage and dispensing structure illustrated in FIGURE 1 taken substantially on the line 3—3 in FIGURE 2 showing the tray of the structure in a position assumed thereby during withdrawal of the tray from the base of the structure.

FIGURE 7 is an enlarged partial section of a modification of the storage and dispensing structure illustrated in FIGURE 1 similar to the section of FIGURE 6 and showing the tray of the structure in a position assumed thereby during insertion of a tray within the base of the structure.

With particular reference to the figures of the drawing, one embodiment of the present invention will now be disclosed in detail.

As shown best in FIGURES 1–3 the storage and dispensing structure 10 of the invention includes the base 12, the barrel 14 secured to the base 12 for receiving single slices of bread or similar material therein and the tray 16. In use the tray 16 is adapted to be inserted within the base 12 and withdrawn therefrom to withdraw a single slice of bread for the base 12, which bread is fed into the base from the barrel 14.

More specifically the barrel 14 is substantially rectangular and includes the fixed sides 18, 20 and 22 connected in a rectangular opening 24 in the base 12 at the bottom thereof and to the top 26 at the top. The side 28 of the barrel 14 is removable.

Side 28 is provided with the flanges 30 and 32 at the edges thereof producing the grooves 34 in which the edges 36 of the sides 18 and 22 are received. In addition the side 28 is provided with the outwardly extending flange 38 therearound to provide stiffness therefor. Additionally the side 28 extends below the flange 38 at the bottom of the side 28 to provide a flange portion 40 thereon engageable behind the cross bar 42 on the base 12 with the side 28 in position on the barrel 14, as shown in FIGURE 3.

Thus the barrel 14 may be loaded with individual slices of bread positioned horizontally therein with the side 28 removed therefrom. The side 28 of the barrel 14 is then secured to the barrel by placing the flange portion 40 of the side 28 behind the cross bar 42 and tilting the upper portion of the side 28 toward the barrel 14.

On tilting the side 28 toward the barrel 14 the edges 36 of the sides 18 and 22 will be engaged in the grooves 34 provided at the opposite edges of the side 28. Also, the abutment 44 formed in the top of the side 28 will engage the cross bar 46 supported by the top 26 and sides 18 and 22 to provide a substantially complete seal of the barrel 14. The side 28 is locked in the position shown in FIGURE 3 by means of the bead 48 and groove 50 on the cantilevered portion 52 of the top 26 and the tab 54 secured to the top of the cover 28 respectively, as shown best in FIGURES 3 and 5.

The entire storage and dispensing structure 10 may be constructed of a plastic such as a high impact polyethylene or of a thin gage of metal such as aluminum or stainless steel. The tab 54 is therefore resilient so that removal of the side 28 from the barrel 14 requires only depression of the tab 54 to disengage the bead 48 from the groove 50 and pulling outward on the tab 54 to rotate the side 28 of the barrel 14 about the cross bar 42.

Each individual slice of bread positioned within the barrel 14 horizontally is offset slightly in a vertical direction as they pass downwardly through the barrel 14 under the force of gravity due to the inclination with respect to the vertical provided in the barrel 14, as shown best in FIGURE 3. For best results it is found that an inclination of from fifteen to twenty-five degrees inclination of the barrel with respect to a vertical position thereof is desirable. With a smaller angle the individual slices of bread are not easily separable on withdrawal of the tray from the base whereby jamming of the bread in the barrel at the connection between the barrel 14 and base 12 results, especially with soft breads.

Base 12, as shown best in FIGURES 1, 3 and 4, is substantially rectangular and includes the parallel opposite sides 56 and 58, the rear side 60 and the bottom 62. The back of the base 12 is enclosed at the top by the cover portion 64. The sides 56 and 58 are separated by the cross bar 42 previously considered and together with the cross bar 42 and bottom 62 provide an opening or throat 65 at the front side 66 of the base opposite the back side 60 thereof.

The bottoms of the barrel sides 18, 20 and 22 are secured to the base 12 around the opening 24 therein formed by the cover member 64, sides 56 and 58 and cross bar 42 by convenient means, such as a suitable adhesive. Leg members 68 are provided substantially at the four corners of the base 12, as shown best in FIGURES 1-4, to support the storage and dispensing structure 10 and to provide lateral stability therefor in view of the inclined barrel 14 thereof.

The legs 68 are provided with feet portions 70 which again may be secured thereto by a suitable adhesive. The feet portions 70 may be constructed of convenient material, such as a soft rubber having a relatively high coefficient of friction so that it will not be necessary to hold the storage and dispensing structure 10 on withdrawing or inserting the tray 16 within the throat 65 in the front 65 of the base 12.

The base 12 further includes the ramps 74 on the interior thereof secured to or integral with the parallel sides 56 and 58. Ear members 76 are also provided on the sides 56 and 58 of the base 12 extending substantially horizontally and toward each other within the base 12, as shown best in FIGURES 3 and 4. The ears 76 provide bottom support for the bread or other material loaded in the barrel 14.

Tray 16 comprises a substantially flat plate 78 having parallel slots 80 and 82 therein extending from the edge 84 thereof toward the edge 86 which provide a flexible central plate portion 88. A flange 90 inclined to the vertical is secured to the flexible central portion 88 of the plate 78 in spaced relation thereto, as shown best in FIGURES 3 and 4.

A vertically extending flange 92 is provided at the edge 86 of the plate 78 as a handle therefor by which the tray 16 may be gripped to insert it within the throat 65 or withdraw the tray with a slice of bread thereon from the base 12. Plate 78 is further provided with opposite vertically extending flanges 94 and 96 which are secured thereto to close the throat 65 with the tray 16 completely inserted in the base 12, as shown in FIGURE 3.

In operation of the tray 16, with the tray 16 removed from the base 12, the lowest slice of bread 98 in the barrel 14 is moved into a position where it rests on ears 76 of the base 12 by gravitational forces, as shown in FIGURE 3. The edge 84 of the tray 16 is then inserted in the throat 65 of the base 12. It will be noted that since the throat 65 of the base 12 is of substantial vertical dimension much greater than the vertical dimension of the plate 78 and flange 90 that no great degree of care is necessary in aligning the tray 16 with the throat 65 on inserting the tray in the throat.

As the tray 16 is inserted in the base 12 through the throat 65 the ramps 100 and 102 extending between the plate 78 and flange 94 of the tray 16 will engage the ramps 74 adjacent the sides 56 and 58 of the base 12 so that the tray 16 is cammed upwardly as it is inserted in the base 12 to align the flanges 94 and 96 with the throat 65. Thus the throat 65 is completely closed by the flanges 94 and 96 with the tray 16 inserted entirely within the base 12, as shown in FIGURE 3.

During the insertion of the tray 16 in the base 12, as the tray 16 is cammed upwardly by engagement of the ramps in the base and on the tray, the flange 90 carried by the flexible central portion 88 of the tray 16 will be cammed downwardly relative to the plate 78 due to engagement thereof with the ears 76 of the base 12, as shown best in conjunction with the modified storage and dispensing structure of FIGURE 7. As the tray 16 is completely inserted in the base 12 the flange 90 clears the inner ends of the ears 76 and snaps upwardly into the position shown in FIGURE 3.

Thus on withdrawal of the tray 16 from the base 12 the flange 90 rides over the top of the ears 76 since the flange 90, as previously indicated, is in spaced relation to the plate 78 with the portion 88 of the plate 78 in an unstressed condition, as shown in FIGURE 3. The flange 90 thus engages the inner edge of the lower slice of bread 98 resting on the ears 76 and causes the bread 98 to be withdrawn through the throat 65 with the tray 16.

As is shown best in FIGURE 6, since the flange 90 is inclined toward the edge 86 of plate 78 and since due to the ramps 100 and 102 on the tray 16 the tray tends to pivot slightly clockwise about the flange 90 in engagement with the ears 76 as the tray 16 is withdrawn from the base 12 the flange 90 has a tendency to cut into the inner edge of the lower slice of bread 98 to provide a more positive grip thereon as the tray 16 is removed from the throat 65 whereby separation of the bottom slice of bread from the slices of bread resting thereon is greatly facilitated.

In the modification of the storage and dispensing structure 10 illustrated in FIGURE 7 the cross bar 42 is provided with a slot 104 extending therethrough through which an adjustable member 106 is inserted adjustable within the slot 104 and grooves 108 provided in the sides 56 and 58 of the base 12. The member 106 is adjustable to vary the opening of the throat 65.

With this exception the modification of the storage and dispensing structure 10 illustrated in FIGURE 7 is exactly the same as the structure illustrated in FIGURES 1-6. Thus identical numbers have been used for identical parts in the modified storage and dispensing structure illustrated in FIGURE 7.

While one embodiment of the present invention and a single modification thereof have been disclosed in detail, it will be understood that other embodiments and modifications are contemplated. It is the intention to include all embodiments and modifications of the invention which are defined by the appended claims within the scope of the invention.

What I claim as my invention is:

1. A dispensing structure comprising a base, means for feeding stacked articles into said base, means within said base for supporting the end one of said stacked articles and article withdrawing means movable into and out of said base including a resilient relatively movable portion having a part movable into said base below the supporting means and movable above said supporting means for withdrawing the end article from the base and means operable between the base and said means for withdrawing the end article from the base for moving the means for withdrawing the end article from the base above the supporting means to facilitate the relative movement of the resilient portion thereof on movement of the means for withdrawing the end article from the base into the base.

2. Structure as set forth in claim 1 wherein the means for supporting stacked articles in the base comprises horizontally extending ear members secured to opposite sides of the base.

3. Structure as set forth in claim 1 wherein the means for withdrawing the end stacked article from the base comprises a tray including a substantially flat plate member of resilient material having a pair of parallel slots therein extending from one end thereof to form a central portion and a flange projecting from one side of the plate member secured to the end of the central portion thereof between said slots.

4. Structure as set forth in claim 1 wherein the means for moving the means for withdrawing the end article from the base toward the supporting means comprises a ramp at each side of the base below the supporting means and ramps extending from the corresponding sides of the means for withdrawing the end article in camming engagement with the corresponding base ramps.

5. A dispensing structure for bread comprising a rectangular base having ramps on opposite sides thereof, means for feeding stacked bread into the base, parallel ear members projecting from said opposite sides of the base for part of the length thereof for supporting the lowermost slice of bread and a tray movable into the base parallel to said ear members comprising a substantially flat resilient body plate having a pair of parallel slots extending parallel to the ear members from one end of the body plate forming a relatively movable central portion, a flange part extending perpendicularly from one side of the body plate and secured to the one end of the central portion thereof, said flange part extending for substantially the entire width of the body member to engage the lower surface of said ear members on insertion of the body member into the base and a pair of ramps secured to the opposite sides of the body plate and engageable with the ramps on said base for camming the body plate of the tray upward into engagement with the underside of said ear members with the tray completely inserted within the base member.

6. A bread storage and dispensing structure comprising a substantially rectangular base having ramps on the interior thereof on opposite sides, an opening in another side thereof perpendicular to and extending between said opposite sides, ear members extending toward each other from said opposite sides above said ramps, a barrel secured to the top of and emptying into said base inclined at an angle to the vertical and including means for loading a plurality of single slices of bread thereinto whereby said single slices of bread are supported on said ears and tend to feed into said base onto said ears from said barrel due to the force of gravity acting thereon and a tray extending into said base through the opening therein for removing single slices of bread from the ears through the opening in said base on withdrawal of the tray from said base after full insertion of the tray into said base, said tray including a substantially flat plate having parallel slots in one end thereof forming a flexible central portion, a flange part secured to said flexible portion of said plate at the one end thereof in spaced relation perpendicularly with respect to the plate and of substantially the same width as the plate and a pair of vertically extending flanges secured to the plate adjacent the other end thereof opposite said slots for closing said opening in the base with the tray inserted within the base and ramp members extending between the lower flange at the other end of said tray and the plate of said tray engageable with the ramps in said base on insertion of the tray into said base for camming the tray plate toward the bottom of the ear members.

References Cited in the file of this patent

UNITED STATES PATENTS

| | | |
|---|---|---|
| 425,996 | Dieterich | Apr. 22, 1890 |
| 511,865 | Sherman | Jan. 2, 1894 |
| 1,419,075 | Prosser | June 6, 1922 |
| 1,440,101 | Pfund et al. | Dec. 26, 1922 |
| 1,677,938 | Van Sickle | July 24, 1928 |
| 1,755,655 | Langenfeld | Apr. 22, 1930 |
| 1,973,867 | Cook | Sept. 18, 1938 |
| 2,299,940 | Thomasma | Oct. 27, 1942 |
| 2,782,791 | Sigo | Feb. 26, 1957 |

FOREIGN PATENTS

| | | |
|---|---|---|
| 339,764 | France | June 18, 1904 |
| 481,003 | Great Britain | Mar. 3, 1938 |
| 483,696 | Great Britain | Apr. 25, 1938 |